(12) United States Patent
Yang et al.

(10) Patent No.: US 11,106,084 B2
(45) Date of Patent: Aug. 31, 2021

(54) LIGHT SOURCE DEVICE, BACKLIGHT MODULE AND LIQUID CRYSTAL DISPLAY DEVICE

(71) Applicants: Hefei Xinsheng Optoelectronics Technology Co., Ltd., Hefei (CN); BOE Technology Group Co., Ltd., Beijing (CN)

(72) Inventors: Bo Yang, Beijing (CN); Fengzhen Lv, Beijing (CN); Xinxia Zhang, Beijing (CN); Xiao Guo, Beijing (CN); Qun Li, Beijing (CN); Huan Ni, Beijing (CN)

(73) Assignees: Hefei Xinsheng Optoelectronics Technology Co., Ltd., Anhui (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/640,200

(22) PCT Filed: Apr. 11, 2019

(86) PCT No.: PCT/CN2019/082321
§ 371 (c)(1),
(2) Date: Feb. 19, 2020

(87) PCT Pub. No.: WO2019/218819
PCT Pub. Date: Nov. 21, 2019

(65) Prior Publication Data
US 2020/0183231 A1  Jun. 11, 2020

(30) Foreign Application Priority Data
May 16, 2018 (CN) .......................... 201810467982.3

(51) Int. Cl.
*G02F 1/13357* (2006.01)
*G02F 1/1333* (2006.01)
*G02F 1/1335* (2006.01)

(52) U.S. Cl.
CPC .. *G02F 1/133606* (2013.01); *G02F 1/133382* (2013.01); *G02F 1/133607* (2021.01)

(58) Field of Classification Search
CPC ............... G02F 2001/133607; G02F 1/133382
See application file for complete search history.

(56) References Cited

U.S. PATENT DOCUMENTS 6,627,305 B1 * 9/2003 Deane ............... H01L 31/02327
428/304.4
2004/0165124 A1 * 8/2004 Yu ..................... G02F 1/133382
349/61

(Continued)

FOREIGN PATENT DOCUMENTS

CN 1532610 A 9/2004
CN 103454713 A 12/2013

(Continued)

*Primary Examiner* — Alexander P Gross
(74) *Attorney, Agent, or Firm* — Banner & Witcott, Ltd.

(57) ABSTRACT

A light source device, a backlight module and a liquid crystal display device are provided. The backlight module includes a prism structure, wherein the prism structure includes a substrate, prismatic tooth portions and a transparent sealing portion which are arranged in a stacked manner; and the transparent sealing portion seals the prismatic tooth portions, and the space between the prismatic tooth portions and the transparent sealing portion is a vacuum space.

19 Claims, 3 Drawing Sheets

(56) References Cited

U.S. PATENT DOCUMENTS

| | | | |
|---|---|---|---|
| 2006/0152651 A1* | 7/2006 | Negley | G02F 1/133606 |
| | | | 349/64 |
| 2009/0009686 A1* | 1/2009 | Obata | G02B 5/045 |
| | | | 349/64 |
| 2017/0045772 A1* | 2/2017 | You | G02F 1/133385 |
| 2018/0172897 A1* | 6/2018 | Min | G02B 27/28 |
| 2020/0183231 A1 | 6/2020 | Yang et al. | |

FOREIGN PATENT DOCUMENTS

| | | |
|---|---|---|
| CN | 106646687 A | 5/2017 |
| CN | 108459439 A | 8/2018 |
| JP | 2003337333 A | 11/2003 |

* cited by examiner

LIGHT SOURCE DEVICE, BACKLIGHT MODULE AND LIQUID CRYSTAL DISPLAY DEVICE

CROSS REFERENCE TO RELATED APPLICATIONS

The application is a U.S. National Phase Entry of International Application No. PCT/CN2019/082321 filed on Apr. 11, 2019, designating the United States of America and claiming priority to Chinese Patent Application No. 201810467982.3 filed on May 16, 2018. The present application claims priority to and the benefit of the above-identified applications and the above-identified applications are incorporated by reference herein in their entirety.

TECHNICAL FIELD

Embodiments of the present disclosure relate to a light source device, a backlight module and a liquid crystal display device.

BACKGROUND

With the development of science and technology, liquid crystal display devices are used more and more widely.

For example, the liquid crystal display device includes a liquid crystal display panel and a backlight module, and the liquid crystal display panel includes an opposite substrate (e.g., a color filter substrate) and an array substrate that are opposite to each other, and a liquid crystal layer between the opposite substrate and the array substrate. Light emitted by a light source assembly in the backlight module can sequentially pass through a prism structure of the backlight module, the array substrate, the liquid crystal layer and the opposite substrate and then be emitted out.

SUMMARY

Embodiments of the present disclosure provide a light source device, a backlight module and a liquid crystal display device, so that the liquid crystal display device has a better display effect.

In an aspect, at least one embodiment of the present disclosure provides a backlight module, and the backlight module includes a prism structure, the prism structure includes a substrate, a plurality of prismatic tooth portions and a transparent sealing portion that are stacked; the transparent sealing portion seals the plurality of prismatic tooth portions, and a space between the plurality of prismatic tooth portions and the transparent sealing portion is a vacuum space.

For example, the vacuum space refers to that a gas pressure of the space between the prism tooth portions and the transparent sealing portion is smaller than a gas pressure of an environment outside the prism structure.

For example, a material of the transparent sealing portion and a material of the prismatic tooth portions are same.

For example, a thermal conductivity coefficient of the prism structure is less than or equal to $0.01\ W/(m\cdot°C.)$.

For example, a surface which is included by the substrate and which is close to the tooth portion includes a plurality of flat portions spaced apart from each other, and at least one prismatic tooth portion is between adjacent flat portions among the plurality of flat portions.

For example, the backlight module further includes a light source assembly, and the prism structure is on a light exit side of the light source assembly.

For example, the light source assembly includes a light source and a light guide plate; the light source is on a lateral side of the light guide plate or the light source is on a side, away from the prism structure, of the light guide plate.

For example, the substrate is between the transparent sealing portion and the light source assembly.

For example, the light source assembly further includes a heat insulation film stacked with the prism structure.

For example, the backlight module further includes a first diffusion sheet and a second diffusion sheet, the first diffusion sheet is between the light source assembly and the prism structure, and the second diffusion sheet is on a side, away from the light source assembly, of the prism structure.

In another aspect, at least one embodiment of the present disclosure provides a liquid crystal display device, and the liquid crystal display device includes a liquid crystal display panel and the backlight module that is mentioned above.

For example, at least one base substrate in the liquid crystal display panel is doped with a transparent thermal insulation material.

For example, the liquid crystal display panel includes an opposite substrate and an array substrate which are opposite to each other, and a liquid crystal layer between the opposite substrate and the array substrate; a base substrate in the opposite substrate is doped with the transparent thermal insulation material.

For example, the transparent thermal insulation material is silica aerogel.

For example, a thermal conductivity coefficient of the base substrate is less than or equal to $0.02\ W/(m\cdot°C.)$.

In further another aspect, at least one embodiment of the present disclosure provides a light source device including a prism structure and a light source assembly; the light source assembly and the prism structure are configured that light emitted by the light source assembly passes through the prism structure; the prism structure includes a substrate, a plurality of prismatic tooth portions and a transparent sealing portion that are stacked, the plurality of prismatic tooth portions are between the substrate and the transparent sealing portion; the transparent sealing portion seals the plurality of prismatic tooth portions, and a gas pressure of a space between the prismatic tooth portions and the transparent sealing portion is smaller than a gas pressure of an environment outside the prism structure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Figure 1:
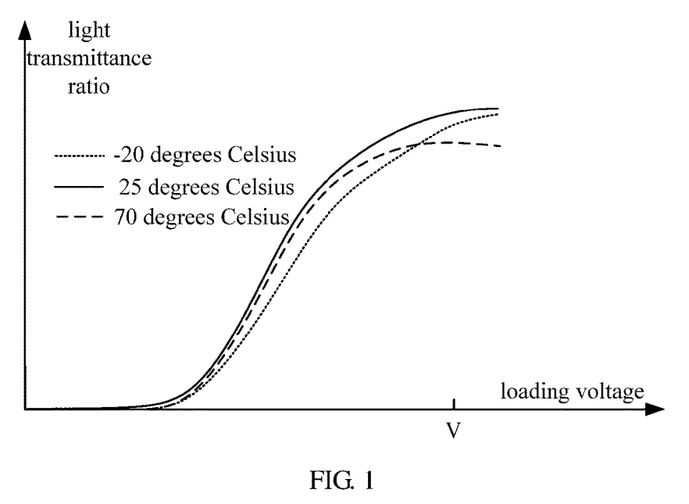
FIG. 1 is a schematic diagram showing a relationship between a loading voltage and a light transmittance ratio of a liquid crystal display panel.

When a liquid crystal display device is in an environment with a high temperature, the liquid crystal display panel has defects such as color cast, decrease in light transmittance, decrease in contrast ratio, etc. Exemplary, FIG. 1 is a schematic diagram showing a curve relationship between a loading voltage and a light transmittance ratio of a liquid crystal display panel, and FIG. 1 schematically shows curves of the loading voltage and the light transmittance ratio of the liquid crystal display panel in cases where an ambient temperature is respectively −20 degrees Celsius, 25 degrees Celsius and 70 degrees Celsius. As illustrated in FIG. 1, under a same loading voltage, both the light transmittance ratio of the liquid crystal display panel in the case where the ambient temperature is −20 degrees Celsius and the light transmittance ratio of the liquid crystal display panel in the case where the ambient temperature is 70 degrees Celsius are less than the light transmittance ratio in the case where the ambient temperature is 25 degrees Celsius. When the loading voltage of the liquid crystal display panel is its normal operating voltage V, the light transmittance ratio in the case where the ambient temperature is −20 degrees Celsius decreases by about 5.4% compared with the light transmittance ratio in the case where the ambient temperature is 25 degrees Celsius; the light transmittance ratio in the case where the ambient temperature is 70 degrees Celsius decreases by about 8.8% compared with the light transmittance ratio in the case where the ambient temperature is 25 degrees Celsius.

Figure 2:
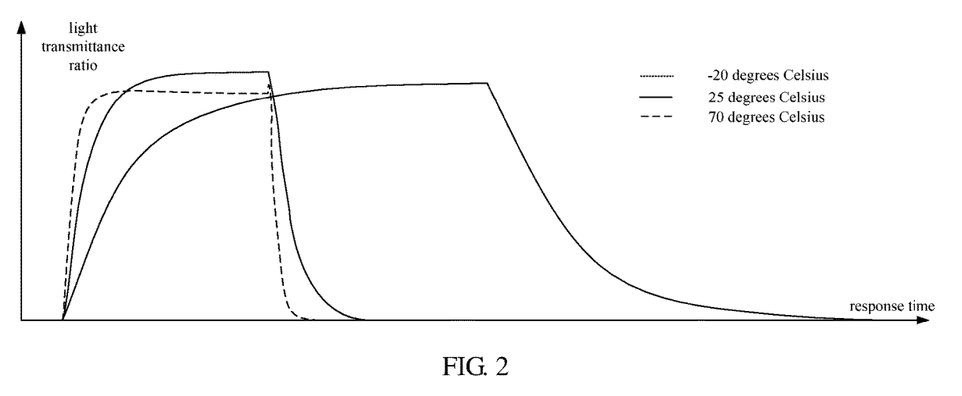
FIG. 2 is a schematic diagram showing a relationship between response time and the light transmittance ratio of the liquid crystal display panel.

When the liquid crystal display device is in an environment with a low temperature, the liquid crystal display panel also has defects such as long response time and the like. Exemplary, FIG. 2 is a schematic diagram showing a curve relationship between the response time and the light transmittance ratio of the liquid crystal display panel, and FIG. 2 schematically shows curves of the response time and the light transmittance ratio of the liquid crystal display panel in cases where the ambient temperature is respectively −20 degrees Celsius, 25 degrees Celsius and 70 degrees Celsius. As illustrated in FIG. 2, on a premise of reaching a same light transmittance ratio, the response time of the liquid crystal display panel in the case where the ambient temperature is 25 degrees Celsius is smaller than the response time in the case where the ambient temperature is −20 degrees Celsius. In FIG. 2, when the loading voltage of the liquid crystal display panel is its normal operating voltage and on the premise of reaching the same light transmittance ratio, an average response time of the liquid crystal display panel in the case where the ambient temperature is −20 degrees Celsius is about 6.1 times of an average response time of the liquid crystal display panel in the case where the ambient temperature is 25 degrees Celsius.

It can be seen from FIG. 1 and FIG. 2, when the current liquid crystal display device is in an environment with a high temperature or a low temperature, performance of the liquid crystal display panel is degraded because of influence of the high temperature or the low temperature, which causes a poor display effect of the liquid crystal display device.

The embodiments of the present disclosure provide a backlight module. As illustrated in FIG. 3 to FIG. 7, the backlight module 0 includes a prism structure 02, the prism structure 02 includes a substrate 021, a plurality of prismatic tooth portions 022 and a transparent sealing portion 023 that are stacked, and the prismatic tooth portions 022 are between the substrate 021 and the transparent sealing portion 023 (transparent sealing film); the transparent sealing portion 023 seals the plurality of prismatic tooth portions 022, and a space between the plurality of prismatic tooth portions 022 and the transparent sealing portion 023 is a vacuum space. The vacuum space refers to that a gas pressure of the space between the prismatic tooth portions and the transparent sealing portion is smaller than a gas pressure of an environment outside the prism structure (in this case, a vacuum degree of the space between the prismatic tooth portions and the transparent sealing portion is higher than a vacuum degree of the environment by which the prism structure is surrounded). Because the prism structure included in the backlight module forms the vacuum space with a higher vacuum degree, the prism structure has a better heat insulation effect, and thus the liquid crystal display device adopting the backlight module has a better display effect.

It should be noted that vacuum refers to a gas state in which a gas pressure in a given space after at least a part of the gas in the given space is discharged is lower than the gas pressure of standard atmosphere. In the embodiments of the present disclosure, when the backlight module is in a non-working state, for example, the gas pressure of the environment by which the prism structure 02 is surrounded (for example, it is approximately equal to the gas pressure of the environment by which the backlight module 0 is surrounded) is approximately equal to the gas pressure of standard atmosphere, and the gas pressure of the space between the prism tooth portions 022 and the transparent sealing portion 023 is much smaller than the gas pressure of standard atmosphere.

As illustrated in FIG. 3 to FIG. 7, bottom ends of the prismatic tooth portions 022 are close to the substrate 021, and tip ends of the prismatic tooth portions 022 face the transparent sealing portion 023. For example, the prismatic tooth portions 022 and the substrate 021 together form a one-piece structure, or the prismatic tooth portions 022 and the substrate 021 are formed separately (for example, materials of the prismatic tooth portions 022 and the substrate 021 are different).

For example, the transparent sealing portion 023 and the prismatic tooth portions 022 are made of a same material. In a process of manufacturing the prism structure 02, the prismatic tooth portions 022 and the transparent sealing portion 023 are made of the same material, so that it is easy to form the prism structure 02.

For example, a thermal conductivity coefficient of the prism structure 02 is less than or equal to 0.01 W/(m·° C.). For example, thermal conductivity coefficients of some thermal insulation materials known by the inventors of the present application is about 0.03 W/(m·° C.). Compared with the way in which the prism structure is made of such thermal insulation material, the thermal conductivity coefficient of the prism structure 02 in the backlight module provided by the embodiments of the present disclosure is smaller, so that the prism structure 02 has a better thermal insulation effect.

For example, as illustrated in FIG. 3 to FIG. 7, the backlight module 0 further includes a light source assembly 01. For example, the substrate 021 of the prism structure 02 is between the transparent sealing portion 023 and the light source assembly 01; in this case, light emitted from the light source assembly 01 passes through the substrate 021, then passes through the prismatic tooth portions 022, and then passes through the transparent sealing portion 023. In other embodiments, for example, the transparent sealing portion 023 is between the substrate 021 and the light source assembly 01; in this case, the light emitted from the light source assembly 01 passes through the transparent sealing portion 023, then passes through the prismatic tooth portions 022, and then passes through the substrate 021.

Figure 3:
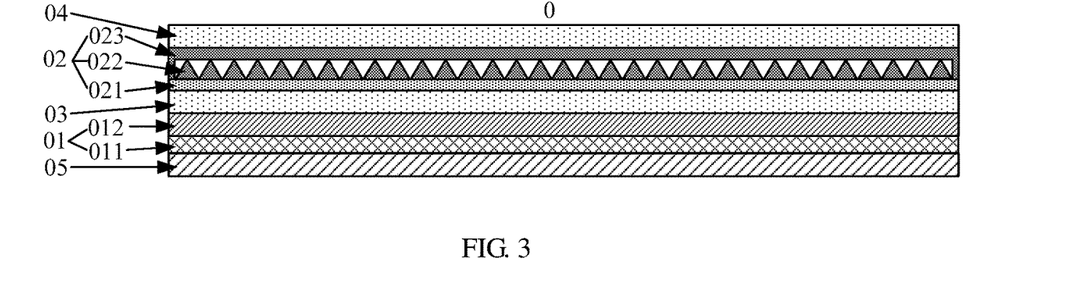
FIG. 3 is a schematic structural diagram of a backlight module provided by at least one embodiment of the present disclosure.
Figure 4A:
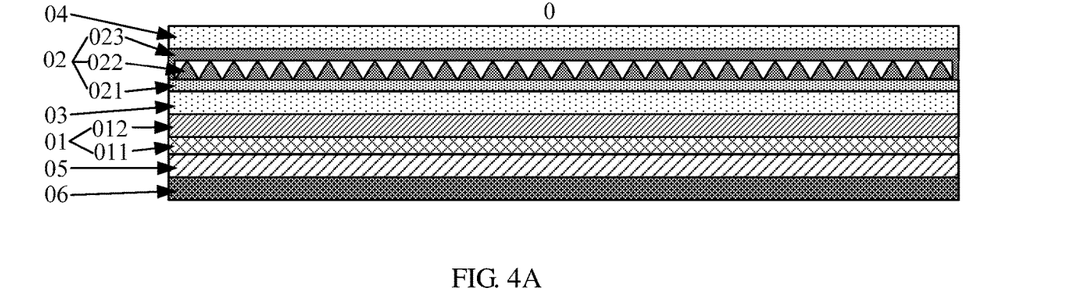
FIG. 4A is a schematic structural diagram of the backlight module provided by another embodiment of the present disclosure.
Figure 4B:
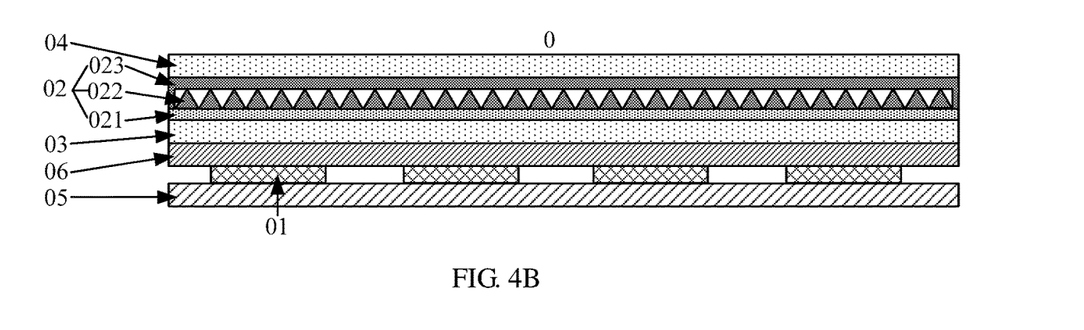
FIG. 4B is a schematic structural diagram of the backlight module provided by further another embodiment of the present disclosure.
Figure 5:
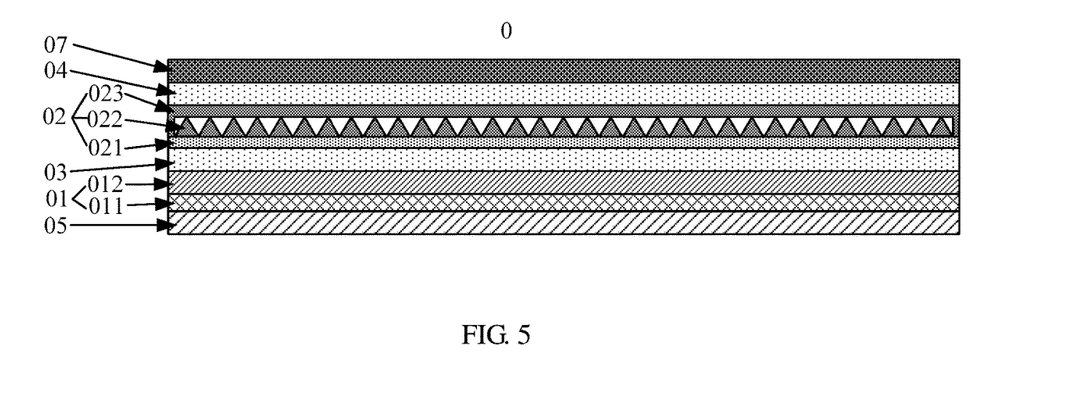
FIG. 5 is a schematic structural diagram of the backlight module provided by further another embodiment of the present disclosure.
Figure 6:
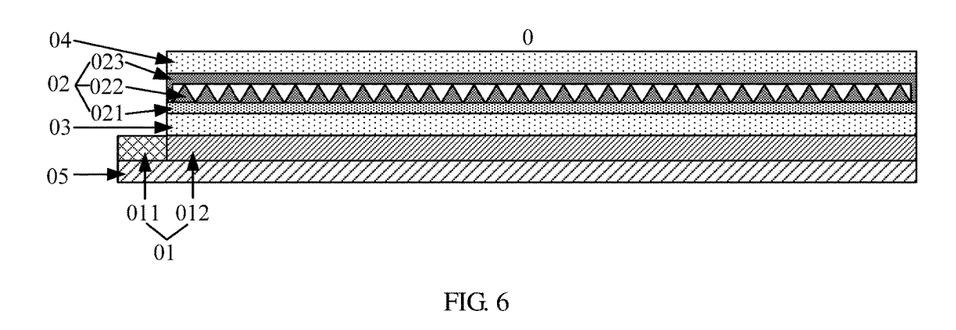
FIG. 6 is a schematic structural diagram of the backlight module provided by further another embodiment of the present disclosure.

For example, as illustrated in FIG. 3 to FIG. 6, the light source assembly 01 is between the prism structure 02 and a back plate 05. In this case, for example, the prism structure 02 is disposed on a light exit side of the light source assembly 01. For example, the planar light source assembly 01 includes a light source 011 and a light guide plate 012; the light source 011 is located on a side, away from the prism structure 012, of the light guide plate 012 (as illustrated in FIG. 3 to FIG. 5), or the light source 011 is on a lateral side of the light guide plate 012 (as illustrated in FIG. 6).

Figure 7:
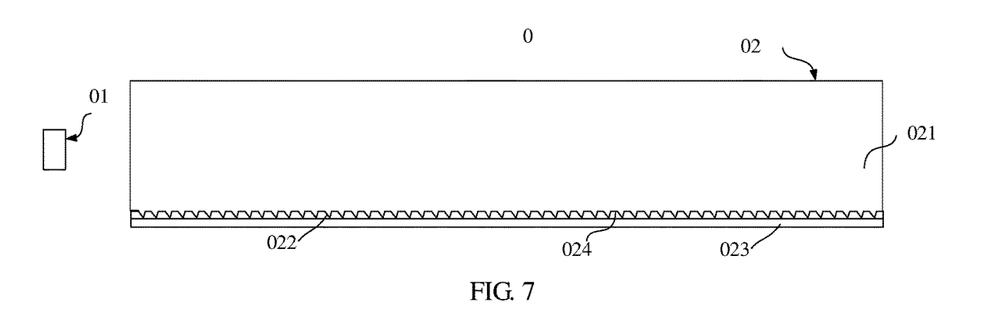
FIG. 7 is a schematic structural diagram of the backlight module provided by further another embodiment of the present disclosure.

For example, as illustrated in FIG. 7, the light source assembly 01 is on a lateral side of the prism structure 02. In this case, for example, a surface which is included by the substrate 021 and which is close to the prismatic tooth portions 022 includes a plurality of flat portions 024 spaced apart from each other, the flat portions 024 are substantially parallel to the surface, away from the prismatic tooth portions 022, of the substrate 021; and at least one prismatic tooth portion 022 is disposed between adjacent flat portions 024. By controlling an incident angle of light entering the prism structure 02 from the lateral side of the prism structure 02, a plurality of reflections (e.g., total reflections) of the light can occur in the prism structure 02, so that the light is transmitted in a direction away from the light source assembly 01 in the prism structure 02, thereby enabling the prism structure 02 per se to function as a light guide plate. For example, the flat portion 024 is a transparent flat portion to improve the light transmittance ratio.

In the following, the backlight module illustrated in FIG. 3 to FIG. 6 is described in detail.

FIG. 3 is a schematic structural diagram of the backlight module provided by at least one embodiment of the present disclosure. As illustrated in FIG. 3, the backlight module 0 includes the light source assembly 01 and the prism structure 02, the prism structure 02 is disposed on the light exit side of the light source assembly 01 (for example, an upper side of the light source assembly 01 is taken as the light exit side in FIG. 3). The prism structure 02 includes the substrate 021, the prismatic tooth portions 022 and the transparent sealing portion 023 that are stacked, and the substrate 021 is close to the light source assembly 01 (i.e., the substrate 021 is located between the transparent sealing portion 023 and the light source assembly 01). The transparent sealing portion 023 is used to seal the prismatic tooth portions 022, and the space between the prismatic tooth portions 022 and the transparent sealing portion 023 is a vacuum space.

In summary, in the backlight module provided by the embodiments of the present disclosure, because the prism structure includes the substrate, the prismatic tooth portions and the transparent sealing portion that are stacked, and the space between the prismatic tooth portions and the transparent sealing portion is a vacuum space, and because vacuum can isolate heat transmission, the backlight module has a good thermal insulation effect, so that the influence produced by the ambient temperature on the liquid crystal display panel in the liquid crystal display device including the backlight module is alleviated, and the display effect of the liquid crystal display device is improved.

Please continue referring to FIG. 3, for example, the backlight module 0 further includes the first diffusion sheet 03, the second diffusion sheet 04 and the back plate 05. The light source assembly 01 includes the light source 011 and the light guide plate 012. The first diffusion sheet 03 is located between the light source assembly 01 and the prism structure 02, and the second diffusion sheet 04 is on a side, away from the light source assembly 01, of the prism structure 02. The back plate 05 is on a side, away from the first diffusion sheet 03, of the light source 011; and the light guide plate 012 is between the light source 011 and the first diffusion sheet 03.

FIG. 4A and FIG. 4B are schematic structural diagrams of the backlight module provided by further another embodiment of the present disclosure. As illustrated in FIG. 4A, on the basis of FIG. 3, the backlight module 0 may further include a heat insulation film 06 attached to a side, away from the prism structure 02, of the light source assembly 01, for example, the heat insulation film 06 is on a side, away from the light source assembly 01, of the back plate 05; or, as illustrated in FIG. 4B, the heat insulation film 06 is on a side, facing the prism structure 02, of the light source assembly 01, for example, a plurality of light source assemblies 01 spaced apart from each other are provided between the heat insulation film 06 and the back plate 05. Because the heat insulation film 06 can further insulate heat transmission, the heat insulation effect of the backlight module 0 is further improved, thereby further alleviating the influence produced by the ambient temperature on the liquid crystal display panel in the liquid crystal display device.

FIG. 5 is a schematic structural diagram of the backlight module according to further another embodiment of the disclosure. As illustrated in FIG. 5, based on FIG. 3, the backlight module 0 further includes a heat insulation film 07 attached to a side, away from the light source assembly 01, of the prism structure 02 (e.g., an upper side of the prism structure 02 in FIG. 5). For example, the heat insulation film 07 is attached to a side, away from the prism structure 02, of the second diffusion sheet 04. The heat insulation film 07 can further isolate heat transmission to further improve the heat insulation effect of the backlight module 0.

It should be noted that the backlight module may include one or more heat insulation films, and a positional relationship between the heat insulation films and the prism structure is not limited as long as the heat insulation films and the prism structure are stacked. For example, in the embodiments of the present disclosure, only the following cases are taken as examples: the case that the side, away from the prism structure, of the light source assembly in the backlight module is provided with the heat insulation film 06 (as illustrated in FIG. 4A), or the case that the heat insulation film 06 is provided between the light source assembly 01 and the prism structure 02 (as illustrated in FIG. 4B), or the case that the side, away from the prism structure 02, of the second diffusion sheet 04 in the backlight module is provided with the heat insulation film 07 (as illustrated in FIG. 5). In some embodiments, the backlight module may include a plurality of heat insulation films. For example, in the backlight module, the side, away from the prism structure, of the light source assembly, and the side, away from the light source assembly, of the prism structure (for example, the side, away from the prism structure, of the second diffusion sheet in the backlight module) may all be respectively provided with the heat insulation films, and no limitation is imposed to this in the embodiments of the present disclosure.

It should be noted that in FIG. 3 to FIG. 5, only the cases where the backlight module is a direct type backlight module are taken as examples. In other embodiments, the backlight module may be a side-in type backlight module. Exemplary, FIG. 6 is a schematic structural diagram of the backlight module provided by further another embodiment of the present disclosure. As illustrated in FIG. 6, the light source 011 and the light guide plate 012 in the light source assembly 01 are arranged side by side on the back plate 05, the light guide plate 012 is arranged on the light exit side (not marked in FIG. 6) of the light source 011, and the first diffusion sheet 03, the prism structure 02 and the second diffusion sheet 04 are sequentially arranged on the light exit side of the light guide plate 012 (not marked in FIG. 6). It should be noted that in FIG. 6, only the case where neither the side away from the prism structure of the light source assembly in the backlight module, nor the side away from the prism structure of the second diffusion sheet in the backlight module is provided with the heat insulation films is taken as an example. For example, in the backlight module, the side away from the prism structure of the light source assembly, and/or a position between the light source assembly and the prism structure, and/or the side away from the light source assembly of the prism structure (e.g., the side, away from the prism structure, of the second diffusion sheet) may be provided with the heat insulation film, which is not limited by the embodiments of the present disclosure.

In summary, in the backlight module provided by the embodiments of the present disclosure, the prism structure includes the substrate, the prismatic tooth portions and the transparent sealing portion that are stacked, the space between the prismatic tooth portions and the transparent sealing portion is a vacuum space, and the vacuum space can isolate heat transmission. Therefore, the backlight module has a good thermal insulation effect, so that the influence produced by the ambient temperature on the liquid crystal display panel in the liquid crystal display device including the backlight module is alleviated, and the display effect of the liquid crystal display device is improved.

Figure 8:
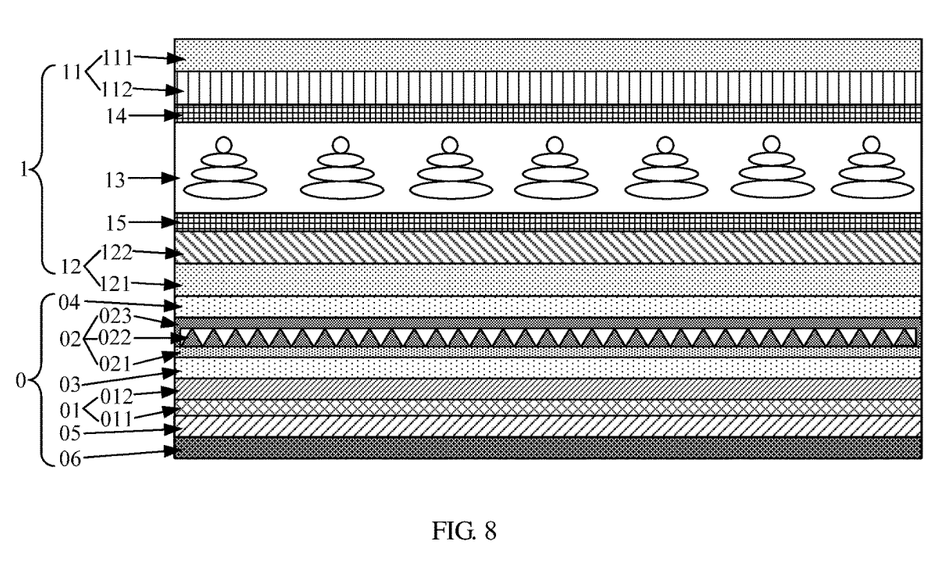
FIG. 8 is a schematic structural diagram of a liquid crystal display device provided by at least one embodiment of the present disclosure.

FIG. 8 is a schematic structural diagram of a liquid crystal display device provided by at least one embodiment of the present disclosure. As illustrated in FIG. 8, the liquid crystal display device includes a liquid crystal display panel 1 and the backlight module 0 provided by any one of the above embodiments.

For example, the liquid crystal display panel 1 may include an opposite substrate (for example, a color filter substrate or a transparent substrate) 11 and an array substrate 12 that are opposite to each other, and a liquid crystal layer 13 between the opposite substrate 11 and the array substrate 12. For example, in the case where the opposite substrate 11 is the color filter substrate, for example, the opposite substrate 11 includes a first base substrate 111 and a color resist layer 112, and the color resist layer 112 is close to the liquid crystal layer 13; for example, the array substrate 12 includes a second base substrate 121 and a thin film transistor layer 122, and the thin film transistor layer 122 is close to the liquid crystal layer 13.

For example, at least one base substrate in the liquid crystal display panel 2 is doped with a transparent thermal insulation material. Exemplary, a base substrate (i.e., the first base substrate 111) in the opposite substrate 11 is doped with the transparent thermal insulation material. For example, a base substrate (i.e., the second base substrate 121) in the array substrate 12 is doped with the transparent thermal insulation material, or both the first base substrate 111 and the second base substrate 121 are doped with the transparent thermal insulation material, which is not limited in the embodiments of the present disclosure. Because at least one base substrate in the liquid crystal display panel is doped with the transparent thermal insulation material, the thermal insulation effect of the liquid crystal display panel is better, and thus the influence produced by the ambient temperature on the liquid crystal display panel including the backlight module in the liquid crystal display device is alleviated.

For example, each layer in the liquid crystal display panel 2 (such as each layer in the backlight module 0 and each layer in the display panel 2) may be made of the transparent thermal insulation material, or may be doped with the transparent thermal insulation material. No limitation is imposed to this in the embodiments of the present disclosure.

For example, the transparent thermal insulation material is silica aerogel. For example, a thermal conductivity coefficient of the base substrate (the first base substrate 111 and/or the second base substrate 121) is less than or equal to 0.02 W/(m·° C.). Because the thermal conductivity coefficient of this base substrate is smaller than that of a common glass substrate (the thermal conductivity coefficient of the common glass substrate is about 0.75 W/(m·° C.)), this base substrate has a good thermal insulation effect.

For example, a first protection layer 14 is provided between the color resist layer 112 and the liquid crystal layer 13, and a second protection layer 15 is provided between the thin film transistor layer 122 and the liquid crystal layer 13. It should be noted that the protection layer is also called over coating (abbreviations: OC).

In summary, in the liquid crystal display device provided by embodiments of the present disclosure, because the prism structure in the backlight module includes the substrate, the prismatic tooth portions and the transparent sealing portion that are stacked, and the space between the prismatic tooth portions and the transparent sealing portion is a vacuum space, and because vacuum can isolate heat transmission, the backlight module has a good thermal insulation effect. Furthermore, because at least one base substrate in the liquid crystal display panel is doped with the transparent thermal insulation material, the thermal insulation effect of the liquid crystal display panel is better. Therefore, the influence produced by the ambient temperature on the liquid crystal display panel including the backlight module in the liquid crystal display device is alleviated, and the display effect of the liquid crystal display device is improved.

Exemplary, the liquid crystal display device may be any product or component with a display function such as a vehicle-mounted liquid crystal display, a liquid crystal panel, an electronic paper, a mobile phone, a tablet computer, a television, a display, a notebook computer, a digital photo frame, a navigator, a wearable display device, etc.

For example, a range of a storage temperature of the liquid crystal display device is from −40 degrees Celsius to 95 degrees Celsius, and a range of an operating temperature of the liquid crystal display device is from −40 degrees Celsius to 90 degrees Celsius.

At least one embodiment of the present disclosure further provides a light source device which includes the prism structure and the light source assembly, the light emitted by the light source assembly passes through the prism structure; the prism structure includes the substrate, the plurality of prismatic tooth portions and the transparent sealing portion that are stacked, and the plurality of prismatic tooth portions are between the substrate and the transparent sealing portion; the transparent sealing portion seals the plurality of prismatic tooth portions, and a gas pressure of the space between the prismatic tooth portions and the transparent sealing portion is smaller than the gas pressure of the environment outside the prism structure, so that the space between the prismatic tooth portions and the transparent sealing portion has a higher vacuum degree.

For example, the light source device is the backlight module as illustrated in FIG. 3 to FIG. 7, and the prism structure, the light source assembly, the diffusion sheet, the heat insulation film and other structures included in the backlight module can be referred to the relevant description in the embodiments of the backlight module, and are not repeated.

For example, the light source device may also be a front light source, which is placed on the display side of the liquid crystal display panel when applied to the liquid crystal display device. In this case, the tip ends of the prismatic tooth portions in the prism structure face the liquid crystal display panel, and the transparent sealing portion is between the substrate and the liquid crystal display panel; or, the tip ends of the prismatic tooth portions face away from the liquid crystal display panel, and the substrate is between the transparent sealing portion and the liquid crystal display panel. In a case where the light source device is the front light source, the arrangement of the prism structure and the light source assembly can refer to the arrangement of the prism structure and the light source assembly in the embodiments illustrated in FIG. 7, and is not repeated.

It should be noted that the embodiments of the backlight module and the embodiments of the liquid crystal display device provided by the embodiments of the present disclosure can be mutually referenced, and embodiments of the present disclosure are not limited to this.

In the present disclosure, the term "and/or" relates to only an association relation describing associated objects, and means that there may be three relations, for example, A and/or B means three cases: only A alone, A and B, or only B. In addition, the character "/" in the present disclosure generally indicates that the associated objects are in a relationship of "or".

What have been described above are only specific implementations of the present disclosure, the protection scope of the present disclosure is not limited thereto. The protection scope of the present disclosure should be based on the protection scope of the claims.

What is claimed is:

1. A backlight module, comprising a prism structure,
wherein the prism structure comprises a substrate, a plurality of prismatic tooth portions, and a transparent sealing portion, wherein the plurality of prismatic tooth portions and the transparent sealing portion are stacked on the substrate,
the transparent sealing portion seals the plurality of prismatic tooth portions, and a space between the plurality of prismatic tooth portions and the transparent sealing portion is a vacuum space, and
each of the substrate, the plurality of prismatic tooth portions, and the transparent sealing portion is doped with a transparent thermal insulation material.

2. The backlight module according to claim 1, wherein the vacuum space refers to that a gas pressure of the space between the plurality of prism tooth portions and the transparent sealing portion is smaller than a gas pressure of an environment outside the prism structure.

3. The backlight module according to claim 1, wherein a material of the transparent sealing portion and a material of the plurality of prismatic tooth portions are same.

4. The backlight module according to claim 1, wherein a thermal conductivity coefficient of the prism structure is less than or equal to 0.01 W/(m·° C.).

5. The backlight module according to claim 1, wherein a surface which is comprised by the substrate and which is close to the plurality of prismatic tooth portions comprises a plurality of flat portions spaced apart from each other, and at least one of the plurality of prismatic tooth portions is between adjacent flat portions among the plurality of flat portions.

6. The backlight module according to claim 1, wherein the plurality of prismatic tooth portions and the substrate together form a one-piece structure.

7. The backlight module according to claim 1, wherein the plurality of prismatic tooth portions directly contact the transparent sealing portion.

8. The backlight module according to claim 1, further comprising a light source assembly, wherein the prism structure is on a light exit side of the light source assembly.

9. The backlight module according to claim 8, wherein the light source assembly comprises a light source and a light guide plate, wherein the light source is on a lateral side of the light guide plate or the light source is on a side, away from the prism structure, of the light guide plate.

10. The backlight module according to claim 8, wherein the substrate is between the transparent sealing portion and the light source assembly.

11. The backlight module according to claim 8, further comprising: a heat insulation film stacked with the prism structure.

12. The backlight module according to claim 8, further comprising: a first diffusion sheet and a second diffusion sheet, wherein
the first diffusion sheet is between the light source assembly and the prism structure, and the second diffusion sheet is on a side, away from the light source assembly, of the prism structure.

13. The backlight module according to claim 1, wherein each of the plurality of prismatic tooth portions comprises a bottom end and a tip end, bottom ends of the plurality of prismatic tooth portions are close to the substrate, and tip ends of the plurality of prismatic tooth portions face the transparent sealing portion.

14. The backlight module according to claim 13, wherein the tip ends of the plurality of prismatic tooth portions directly contact the transparent sealing portion.

15. A liquid crystal display device, comprising: a liquid crystal display panel and a backlight module, wherein the backlight module comprises a prism structure, the prism structure comprising a substrate, a plurality of prismatic tooth portions and a transparent sealing portion that are stacked, the transparent sealing portion seals the plurality of prismatic tooth portions, and a space between the plurality of prismatic tooth portions and the transparent sealing portion is a vacuum space,
wherein the liquid crystal display panel comprises an opposite substrate and an array substrate which are opposite to each other, and a liquid crystal layer between the opposite substrate and the array substrate, and
at least one of a base substrate of the opposite substrate and a base substrate of the array substrate in the liquid crystal display panel is doped with a transparent thermal insulation material.

16. The liquid crystal display device according to claim 15, wherein the base substrate of the opposite substrate is doped with the transparent thermal insulation material.

17. The liquid crystal display device according to claim 15, wherein the transparent thermal insulation material is silica aerogel.

18. The liquid crystal display device according to claim 15, wherein a thermal conductivity coefficient of the base substrate doped with the transparent thermal insulation material is less than or equal to 0.02 W/(m·° C.).

19. A light source device, comprising a prism structure and a light source assembly, wherein
the light source assembly and the prism structure are configured such that light emitted by the light source assembly passes through the prism structure;
the prism structure comprises a substrate, a plurality of prismatic tooth portions, and a transparent sealing portion that are stacked, and the plurality of prismatic tooth portions are between the substrate and the transparent sealing portion;
the transparent sealing portion seals the plurality of prismatic tooth portions, and a gas pressure of a space between the plurality of prismatic tooth portions and the transparent sealing portion is smaller than a gas pressure of an environment outside the prism structure; and
each of the substrate, the plurality of prismatic tooth portions, and the transparent sealing portion is doped with a transparent thermal insulation material.

* * * * *